United States Patent
Rath et al.

(10) Patent No.: US 6,753,389 B1
(45) Date of Patent: Jun. 22, 2004

(54) METHOD FOR THE PRODUCTION OF HIGHLY REACTIVE POLYISOBUTENES

(75) Inventors: Hans Peter Rath, Grünstadt (DE); Dieter Hahn, Carlsberg (DE); Gerhard Sandrock, Frankenthal (DE); Frans van Deyck, Essen (BE); Bart Vander Straeten, Hever (BE); Eddy De Vree, Stabroek (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/088,402

(22) PCT Filed: Oct. 27, 2000

(86) PCT No.: PCT/EP00/10588

§ 371 (c)(1),
(2), (4) Date: Mar. 19, 2002

(87) PCT Pub. No.: WO01/30869

PCT Pub. Date: May 3, 2001

(30) Foreign Application Priority Data

Oct. 28, 1999 (DE) .......................... 199 52 030

(51) Int. Cl.$^7$ .............................. C08F 2/01; C08F 4/14
(52) U.S. Cl. .................... 526/88; 526/209; 526/210; 526/212; 526/348.7; 585/510; 585/525
(58) Field of Search ..................... 526/88, 237, 209, 526/210, 212, 348.7; 585/510, 525

(56) References Cited

U.S. PATENT DOCUMENTS

| | | | |
|---|---|---|---|
| 4,152,499 A | 5/1979 | Boerzel et al. | 526/52 |
| 5,286,823 A | 2/1994 | Rath | 526/237 |
| 5,408,018 A | 4/1995 | Rath | 56/237 |
| 5,910,550 A | 6/1999 | Rath | 526/237 |
| 5,962,604 A | 10/1999 | Rath | 526/65 |
| 5,973,219 A * | 10/1999 | Colman et al. | |
| 6,148,536 A | 11/2000 | Iijima | 34/92 |
| 6,273,032 B1 | 8/2001 | Ruoff et al. | 123/25 |

FOREIGN PATENT DOCUMENTS

| | | |
|---|---|---|
| EP | 48 12 97 | 4/1992 |
| HU | P9801818 | 11/1998 |

* cited by examiner

*Primary Examiner*—Caixia Lu
(74) *Attorney, Agent, or Firm*—Keil & Weinkauf

(57) ABSTRACT

Polyisobutene is prepared by cationic polymerization of isobutene and/or isobutene-containing hydrocarbons in the liquid phase in the presence of a complex of $BF_3$ and at least one cocatalyst which is preferably chosen from oxygen-containing compounds, the $BF_3$/cocatalyst complex being produced in situ by adding $BF_3$ and cocatalyst to a reaction stream, wherein $BF_3$ and oxygen-containing cocatalyst are added to the reaction stream via a common binary nozzle comprising an outlet for $BF_3$ and an outlet for the oxygen-containing cocatalyst. The invention also describes a binary nozzle having a centrally arranged outlet for the catalyst.

7 Claims, 1 Drawing Sheet

METHOD FOR THE PRODUCTION OF HIGHLY REACTIVE POLYISOBUTENES

Figure 1:
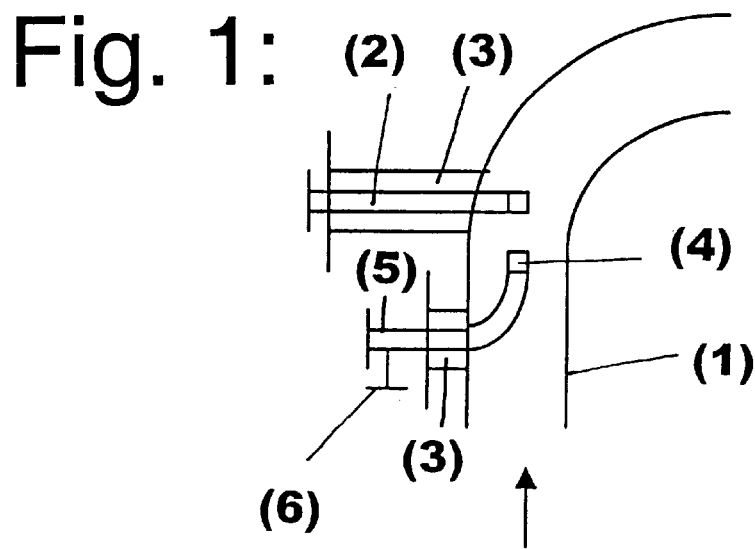

The present invention relates to a process for the preparation of polyisobutene and to a binary nozzle formed for the process.

High molecular weight polyisobutenes having molecular weights of up to several 100,000 dalton have long been known. These polyisobutenes are in most cases prepared with the aid of Lewis acid catalysts, such as aluminum chloride, alkyl aluminum chlorides or boron trifluoride, and in most cases have less than 10 mol % of terminal double bonds (vinylidene groups) and a broad molecular weight distribution, characterized by a dispersity of from 2 to 5. The dispersity D is defined as the quotient formed by the weight-average molecular weight $M_w$ divided by the number-average molecular weight $M_n$ ($D=M_w/M_n$).

The highly reactive polyisobutenes which as a rule have average molar masses of from 500 to 5000 dalton and preferably contain more than 60 mol % of terminal vinylidene groups must be distinguished from these conventional polyisobutenes. In the context of the present application, terminal vinylidene groups or terminal double bonds are understood as meaning those double bonds whose position in the polyisobutene macromolecule is described by the formula

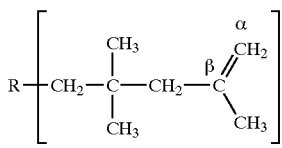

where R is a polyisobutene radical shortened by two isobutene units. The type and proportion of double bonds present in the polyisobutene can be determined with the aid of $^{13}$C-NMR spectroscopy.

Such highly reactive polyisobutenes are used as intermediates for the preparation of additives for lubricants and fuels, as described, for example, in DE-A 27 02 604. The terminal vinylidene groups have the highest reactivity, whereas the double bonds present further toward the interior of the macromolecules have, depending on their position on the macromolecule, only little, if any, reactivity in the customary functionalization reactions. The proportion of terminal vinylidene groups in the molecule is therefore the most important quality criterion for this type of polyisobutene.

Highly reactive polyisobutenes are prepared by $BF_3$-catalyzed, cationic polymerization of isobutene. The actual catalyst is a complex of boron trifluoride and at least one compound capable of forming a complex with $BF_3$. This compound is as a rule selected from oxygen-containing compounds having at least one divalent oxygen atom, e.g. water, alcohols, ethers and carboxylic acids, and is referred to as a cocatalyst.

Further quality criteria for polyisobutenes are their average molecular weight and the molecular weight distribution (also referred to as dispersity) of the macromolecules contained in the polyisobutene. In general, polyisobutenes having average molecular weight ($M_n$) of from 500 to 50,000 dalton are desirable. Molecular weights of from 500 to 5000, preferably from 600 to 3000, in particular from 700 to 2500, dalton are preferred for the preparation of polyisobutenes used as fuel additives, owing to their better activity.

Furthermore, a narrow molecular weight distribution of the polyisobutene molecules is desirable in order to reduce the proportion of undesired, relatively low molecular weight or high molecular weight polyisobutenes in the product produced and thus to improve its quality.

EP 0 481 297 A2 discloses a process for the preparation of polyisobutene. Isobutene and/or isobutene-containing hydrocarbons are prepared in the presence of a polymerization catalyst which consists of complex of $BF_3$ and of an alcohol. The complex is prepared separately from the polymerization reaction by introducing $BF_3$, passing it as a gas or forcing it into the respective alcohol, if required in an inert solvent, and then feeding it to the polymerization of the isobutene. It has also been proposed to feed in additional complexing agent in a separate stream or in the solvent, in the isobutene or in the isobutene-containing hydrocarbons. However, the boron trifluoride complex catalyst is always prepared in a separate reaction and is therefore expensive. Owing to the exothermic nature of the complex formation, cooling apparatuses are additionally required.

EP 0 628 575 A1 describes a process for the preparation of highly reactive polyisobutenes. The polymerization takes place at from 0° C. to –60° C. in the presence of boron trifluoride and secondary alcohols of 3 to 20 carbon atoms. In addition to a separate preparation of the boron trifluoride complex with subsequent introduction into the reaction stream, production of the complex in situ is also proposed. For this purpose, the relevant secondary alcohol, if required together with a solvent and together with the isobutene, is fed into the polymerization apparatus and boron trifluoride is dispersed in the required amount in this mixture of the reactants, in which it reacts with the alcohol to give the boron trifluoride complex catalyst.

In the prior art process comprising in situ preparation of the boron trifluoride complex catalyst, the setting of a specific ratio of $BF_3$ to complexing agent (referred to below as cocatalyst) in the reaction mixture is problematic. Variations in the concentration of $BF_3$ or cocatalyst lead to variations in the catalyst activity and hence to variations in the molecular weight of the polyisobutenes prepared. The variations in the molecular weight and the resulting nonuniformity of the product (which is reflected in an increased dispersity value) adversely affect the product quality.

It was an object of the present invention to provide a process for the continuous preparation of polyisobutene by cationic polymerization of isobutene and/or isobutene-containing hydrocarbons in the liquid phase in the presence of a complex of $BF_3$ and a cocatalyst, the $BF_3$/cocatalyst complex being produced in situ by adding $BF_3$ and cocatalyst to a reaction stream, in which more precise control of the course of the reaction in the reactor is possible.

We have found that this object is achieved, in a process of the generic type, by adding $BF_3$ and cocatalyst via a common binary nozzle having an outlet for $BF_3$ and an outlet for the cocatalyst.

Accordingly, the present invention relates to a process for the continuous preparation of polyisobutene by cationic polymerization of isobutene and/or isobutene-containing hydrocarbons in the liquid phase in the presence of a complex of $BF_3$ and at least one cocatalyst which is preferably selected from oxygen-containing compounds, the $BF_3$/cocatalyst complex being produced in situ by adding $BF_3$ and cocatalyst to a reaction stream, wherein $BF_3$ and oxygen-containing cocatalyst are added to the reaction stream via a common binary nozzle having an outlet for $BF_3$ and outlet for the oxygen-containing cocatalyst.

In the novel process, the outlet orifices of the binary nozzle for boron trifluoride and cocatalyst are preferably arranged spatially directly adjacent to one another.

In contrast to the process of EP 0 628 575 A1, boron trifluoride and oxygen-containing cocatalyst are fed directly into the reaction mixture, also referred to below as reaction stream, and this is effected both separately from one another and separately from the feed of fresh isobutene or isobutene-containing hydrocarbons. If it is liquid under reaction conditions, the cocatalyst can fed in as such, otherwise it can be fed in as a liquid solution in an inert solvent.

According to the invention, the binary nozzle is preferably arranged in the polymerization reactor upstream of the inflow of the isobutene or of the isobutene-containing hydrocarbons, i.e. of the point at which isobutene or the isobutene-containing hydrocarbon mixture is introduced into the polymerization reactor. As a result of this arrangement, in each case fresh catalyst is produced at the point of the highest monomer concentration of the reactor, at and downstream of the isobutene inflow. This is particularly true if the addition of $BF_3$ and oxygen-containing cocatalyst is arranged adjacent to the isobutene inflow. In this arrangement, the fresh isobutene or the isobutene-containing hydrocarbons preferably flows in a flow cone generated by the $BF_3$ and cocatalyst inflow. In a preferred embodiment of the invention, the binary nozzle is arranged in the reactor so that its outlet orifices point in the direction of flow of the reaction mixture, i.e. in the direction of the flow of the reaction stream, in order to ensure the formation of a flow cone of $BF_3$ and cocatalyst inflow in the direction of the isobutene inflow. The novel binary nozzle can of course also be arranged at another point in the reactor. The use of a plurality of binary nozzles is likewise possible and frequently advantageous.

As a result of the arrangement of the binary nozzle, which arrangement is preferred according to the invention, a local concentration of $BF_3$ and cocatalyst which is sufficient for complex formation is produced. At the same time, there is a rapid distribution within the reaction stream, with the result that the heat of reaction is removed. An excess concentration of uncomplexed $BF_3$ in the reaction stream is likewise avoided. The danger of a shift of double bonds in the polymer owing to a high local catalyst concentration is prevented, as well as the variation of the molecular weight.

If the binary nozzle has a central outlet for $BF_3$ and an annular outlet, arranged around the central outlet, for the oxygen-containing cocatalyst, a flow cylinder of cocatalyst forms, at least briefly, downstream of the binary nozzle, into which flow cylinder the $BF_3$ is introduced. The catalyst complex forms, rapid thorough mixing of the components and distribution of the resulting boron trifluoride complex within the reaction stream taking place.

A narrow molecular weight distribution and a high proportion of terminal vinylidene groups in the polymer is furthermore supported if the reaction stream has turbulent flow in the region of the addition of $BF_3$ and cocatalyst and of the inflow of isobutene and/or isobutene-containing hydrocarbons. Measures for generating turbulent flows are known to those skilled in the art.

The novel process is a continuous process. Measures for the continuous polymerization of isobutene in the presence of catalysts comprising boron trifluoride and at least one cocatalyst in inert organic solvents to give polyisobutene are known per se. In a continuous process, a part of the reaction mixture formed in the polymerization reactor is discharged continuously. Of course, an amount of starting materials, in this case isobutene or an isobutene-containing hydrocarbon, corresponding to the discharge is fed continuously to the polymerization reactor. The ratio of the amount of material present in the polymerization reactor to the amount which is discharged is determined by the circulation/feed ratio which, in the continuous polymerization of isobutene to give polyisobutene, is as a rule from 1000:1 to 1:1, according to the invention preferably from 500:1 to 5:1, and in particular from 50:1 to 200:1 v/v. The average residence time of the isobutene to be polymerized in the polymerization reactor can be from 5 seconds to several hours. Residence times of from 1 to 30, in particular from 2 to 20, minutes are particularly preferred.

The polymerization of the isobutene is effected in the reactors customary for the continuous polymerization, such as stirred kettles, tubular reactors, tube-bundle reactors and loop reactors, loop reactors, i.e. tube(-bundle) reactors having stirred kettle characteristics, being preferred. Tubular reactors having tube cross-sections which lead to turbulence in certain regions are particularly favorable here.

The novel process is carried out as a rule at a polymerization temperature of from $-60°$ C. to $+40°$ C., preferably below $0°$ C., particularly preferably from $-5°$ C. to $-40°$ C., especially from $-10°$ C. to $-30°$ C. The heat of polymerization is dissipated accordingly with the aid of a cooling apparatus. This may be operated, for example, with liquid ammonia as coolant. Another possibility for removing the heat of polymerization is by evaporative cooling.

The heat liberated is removed by evaporating the isobutene and/or other readily volatile components of the isobutene feedstock or by evaporating any readily volatile solvent. Preferably, the novel polymerization process is carried out under isothermal conditions, i.e. the temperature of the liquid reaction mixture in the polymerization reactor has a steady-state value and changes only slightly, if at all, during the operation of the reactor.

The concentration of the isobutene in the liquid reaction phase is as a rule from 0.2 to 50, preferably from 0.5 to 20, % by weight, based on the liquid reaction phase. In the preparation of polyisobutenes having a number average molecular weights $M_n$ of from 500 to 5000 dalton, in particular an isobutene concentration from 1 to 20, particularly preferably from 1.5 to 15, % by weight is employed. In the preparation of polyisobutenes having a number average molecular weight $M_n$ above 5000 dalton, an isobutene concentration of from 4 to 50% is preferably employed.

The isobutene conversion can in principle be established as desired. However, it is self-evident that, at very low isobutene conversions, the cost-efficiency of the process is doubtful, whereas at very high isobutene conversions of more than 99% the danger of double bond shifts becomes greater and greater and shorter reaction times and improved heat removal are required. For these reasons, the isobutene conversion is usually taken to values of from 20 to 99%. Isobutene conversions of from 70 to 98% are particularly preferred. As described in WO 96/40808, the process can also be carried out in two or more stages. A two-stage process in which the residual isobutene of the main reactor reacts to about 0.5% in the downstream reactor is a preferred procedure for the novel process.

Both isobutene itself and isobutene-containing $C_4$ hydrocarbon streams, for example $C_4$ fractions, $C_4$ cuts from isobutene dehydrogenation, $C_4$ cuts from steamcrackers and FCC crackers (FCC: Fluid Catalyzed Cracking), are suitable as feedstocks for the novel process, provided that they have been substantially freed from 1, 3-butadiene contained therein. $C_4$ hydrocarbon streams suitable according to the invention contain as a rule less than 500, preferably less than 200, ppm of butadiene. The presence of 1-butene and cis-and trans-2-butene is substantially noncritical for the novel process and does not lead to selectivity losses. Typically, the concentration in the $C_4$-hydrocarbon streams is from 40 to 60% by weight. For the use of $C_4$ cuts as feedstock, the hydrocarbons other than isobutene assume the role of an inert solvent. The isobutene feedstock may contain small amounts of contaminants, such as water, carboxylic acids or mineral acids, without critical declines in yield or selectivity occurring in the polymerization. This results in a lower alcohol/ether consumption, which changes the abovementioned molar ratios in favor of $BF_3$. It is expedient to avoid an accumulation of these impurities in the plant, by removing such pollutants from the isobutene-containing feedstock, for example by adsorption on solid adsorbents, such as active carbon, molecular sieves or ion exchangers.

Solvents or solvent mixture which are inert to the reagents used are suitable for the novel process. Suitable solvents are, for example, saturated hydrocarbons, such as butane, pentane, hexane, heptane, octane, e.g. n-hexane, i-octane, cyclobutane or cyclopentane, halogenated hydrocarbons, such as methyl chloride, dichloromethane or trichloromethane, and mixtures of the abovementioned compounds. Before they are used in the novel process, the solvents are preferably freed from impurities, such as water, carboxylic acids or mineral acid, for example by adsorption on solid adsorbents, such as active carbon, molecular sieves or ion exchangers.

Expediently gaseous boron trifluoride is used as a raw material for the preparation of the boron trifluoride complexes, it being possible to use technical-grade boron trifluoride still containing small amounts of sulfur dioxide and $SiF_4$ (purity: 96.5% by weight), but preferably high-purity boron trifluoride (purity: 99.5% by weight).

Suitable cocatalysts are as a rule oxygen-containing compounds which preferably have at least one divalent oxygen atom. Suitable oxygen-containing compounds in addition to water are organic compounds of up to 30 carbon atoms. Examples of these are $C_1$–$C_{30}$-alkanols and cycloalkanols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Preferred among these are monohydric alkanols of 1 to 20, in particular 1 to 4, carbon atoms, which if required can be used together with the $C_1$–$C_{20}$-dialkyl ethers. According to the invention, molar ratios of boron trifluoride to oxygen-containing compound in boron trifluoride complex catalysts are preferably from 1:1 to 1:10, in particular from 1:1.1 to 1:5, especially from 1:1.2 to 1:2.5. The $BF_3$ concentration in the reactor is varied as a rule in the range from 0.01 to 1, in particular from 0.02 to 0.7, especially from 0.03 to 0.5, % by weight, based on the liquid reaction phase.

In the novel process, the oxygen-containing compound in the boron trifluoride complex catalyst particularly preferably comprises at least one monohydric, secondary alcohol A of 3 to 20 carbon atoms. Examples of suitable secondary alcohols are the following: isopropanol, 2-butanol and furthermore sec-pentanols, sec-hexanols, sec-heptanols, sec-octanols, sec-nonanols, sec-decanols and sec-tridecanols. In addition to monohydric secondary alcohols, (poly)etherols of propene oxide and of butene oxide can also be used according to the invention. 2-Butanol and in particular isopropanol are preferably used.

The polyisobutene prepared by the novel process generally contains more than 80 mol % of terminal vinylidene groups and has an average molecular weight of from 500 to 50,000, preferably from 500 to 5000. In particular, polyisobutenes having an average molecular weight of from 800 to 3000, particularly preferably from 900 to 2500, dalton can be specifically prepared by the novel process. The dispersity $M_w/M_n$ is preferably not more than 1.6.

For working up, the reaction discharge is expediently passed into a medium with deactivates the polymerization catalyst and thus stops the polymerization. For example, water, alcohols, acetonitrile, ammonia or aqueous solutions of mineral bases or carbonates can be used for this purpose. Beforehand, the catalyst can also be separated off from the reaction stream according to WO 99/31151 and recycled to the polymerization reaction. For example, the boron trifluoride complex catalyst separated off in this way can be recycled to the polymerization reaction together with the cocatalyst via the novel binary nozzle.

When separating off the catalyst from the reactor discharge, it is advisable beforehand to reduce the isobutene concentration in the discharge to below 2, preferably 1, in particular below 0.5, % by weight, based on the discharge. For this purpose, the polymerization process is preferably carried out in two stages. This second polymerization stage is preferably operated at the same temperature as the first polymerization stage or at a lower polymerization temperature than the first polymerization stage. As a rule, the temperature difference is from 0 to 20, preferably from 0 to 10, Kelvin.

The further working up is carried out in a conventional manner. If necessary after one or more washes to remove catalyst, the polyisobutene is freed from unconverted isobutene, solvent and oligomers by distillation and can be removed from the distillation column as a bottom product.

The novel process permits very precise and rapid control of the isobutene polymerization, which leads to a narrower molecular weight distribution and a higher content of terminal vinylidene groups in the polymer. The energy liberated during the formation of the boron trifluoride complex is removed in the reaction stream, with the result that additional cooling in the catalyst feed is dispensed with. Producing the boron trifluoride complex catalyst directly in the reaction stream of the reactor furthermore dispenses with the apparatuses required in the case of the use of a $BF_3$ complex prepared beforehand, for the preparation and storage of said complex.

Polyisobutenes having a narrow molecular weight distribution, characterized by a dispersity $M_w/M_n$ of $\leq 2.0$, preferably $\leq 1.8$, in particular $\leq 1.6$, and a high proportion, i.e. $\geq 60\%$, in particular $\geq 70\%$, of the terminal vinylidene groups, can be prepared by the novel process. The number average molecular weight of the polyisobutene thus prepared (determined by means of gel permeation chromatography against commercial polyisobutene standards) is preferably from 500 to 5000, in particular from 600 to 2000, dalton. It is of course also possible to prepare higher molecular weight polyisobutenes, i.e. having a number average molecular weight of from 5000 to 50,000 dalton and a comparably high terminal vinylidene group content and a comparable dispersity by the novel process.

The present invention furthermore relates to a binary nozzle suitable for the novel process. This binary nozzle has an outlet for $BF_3$ and an outlet for oxygen-containing cocatalyst, the outlet for $BF_3$ being in the form of a central, preferably circular or ellipsoidal orifice and the outlet for oxygen-containing cocatalyst being arranged in an annular manner around the outlet for $BF_3$. The outlet provided for the cocatalyst may be, for example, in the form of an arc-shaped orifice which may be interrupted by one or more webs. The outlet provided for the cocatalyst may also be formed by a plurality of slots or orifices in the form of radially arranged arcs or arc segments. Preferably, the area of the outlet orifice for the catalyst is smaller than the cross-sectional area of the cocatalyst feed in the binary nozzle.

In an advantageous embodiment, a radial distance is provided between the outlet for $BF_3$ and the outlet for oxygen-containing cocatalyst. The dimensioning of the radial distance depends on the dimensions and the type of reactor and on the conditions in the reaction stream, for example the flow rate, and can be determined by those skilled in the art by means of corresponding tests.

DETAILED DESCRIPTION OF DRAWINGS

The invention is explained in more detail below on the basis of examples and with reference to the attached drawings.

FIG. 1: shows a cut-out from a loop reactor and

Figure 2A:
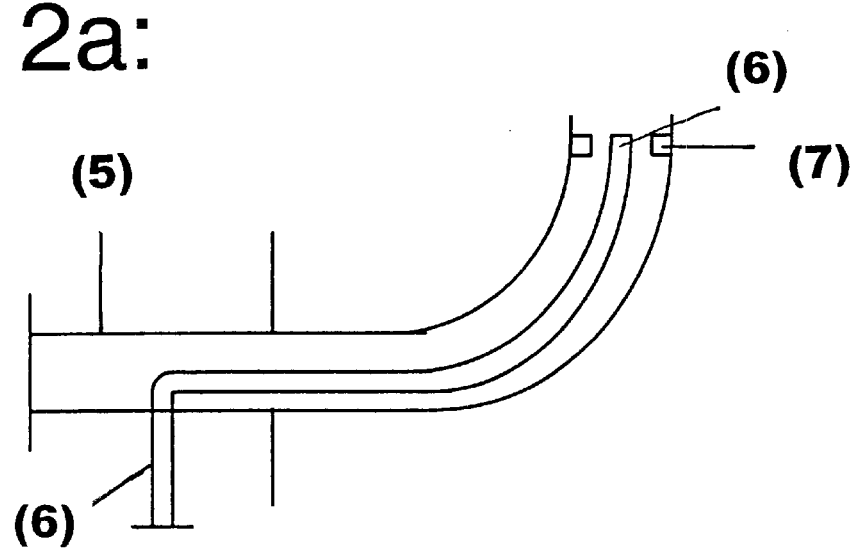
Figure 2B:
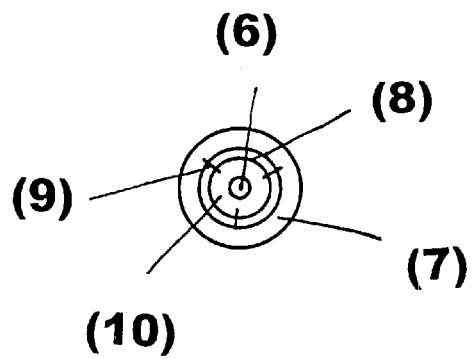

FIG. 2: shows a binary nozzle for the novel process in cross-section (FIG. 2a) and the outlet orifice (FIG. 2b)

FIG. 1 shows a cut-out from a loop reactor which is designed for the novel process. A reaction mixture circulates in the pipeline (1) in the direction of the arrow. The reaction mixture mainly comprises unconverted isobutene, possibly solvent, catalyst and oligomers and polymers. The isobutene feedstock is fed in via a feed line (2) which is provided with a fastening connection piece (3). Said feedstock is preferably pure isobutene, if necessary diluted with an inert solvent, but may also be an isobutene-containing hydrocarbon mixture, such as a low-butadiene, high-isobutene $C_4$ cut. A feed line (4) in the form of a novel binary nozzle for the components of the boron trifluoride catalyst is arranged upstream of the feed line (2). The outlet of the feed line (4) is arranged close to the outlet of the feed line (2), centrally in the pipeline (1) of the loop reactor, so that the freshly formed boron trifluoride complex is transported directly to the entry point of the isobutene feedstock, where the highest monomer concentration is present.

The feed line (4) is in the form of a binary nozzle and comprises a tubular feed line (5) for the cocatalyst and a tubular feed line (6) for the boron trifluoride. An outflow (not shown) for the polyisobutene-containing exit stream is arranged upstream of the feed line (4).

The feed line (4) in the form of a binary nozzle is shown more precisely in FIG. 2. FIG. 2a shows a section through the feed line. It consists of a tubular feed line (5) for the cocatalyst, through the wall of which outside the loop reactor a feed line (6) for the boron trifluoride is led. The pipeline (6) for the boron trifluoride is led inside the pipeline (5) for the cocatalyst, up to the exit of the pipeline (5) in the interior of the pipeline (1) of the loop reactor. At the reactor end of the pipeline (5), an annular insert (7) and, if required, an annular insert (10) (omitted in FIG. 2a) are provided, by means of which the outlet cross-section (8) of the pipeline (5) is reduced. The exit of the pipeline (6) for the boron trifluoride is arranged centrally in the orifice of the insert (7). The pipeline (6) for the boron trifluoride and insert (7) and any insert (10) present end at the same height. FIG. 2b shows a plan view of the exit of the binary nozzle. An annular insert (7) is arranged in the outer wall of the pipeline (5) for the cocatalyst. The exit of the pipeline (6) for the boron trifluoride is arranged centrally in the orifice of the insert (7). An annular insert (10) is arranged around the exit of the pipeline (6), so that an annular gap (8) is formed between the outer circumferential surface of the insert (10) and the inner circumferential surface of the insert (7). The insert (7) is fastened to the insert (10) by means of connecting webs (9). A flow cylinder into whose interior the boron trifluoride is passed is formed during the cocatalyst feed.

EXAMPLES

Analysis:

1. In the context of the present application, terminal vinylidene groups or terminal double bonds are understood as meaning double bonds whose position in the polyisobutene macromolecule is described by the formula II

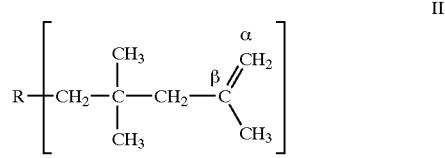

where R is a polyisobutylene radical. The type and amount of double bonds present in the polyisobutene prepared according to the invention are determined with the aid of the $^{13}C$-NMR spectroscopy method, the two carbon atoms of the terminal double bond which are marked with α and β in the formula IIa being identifiable in the $^{13}C$-NMR spectrum by their signals with the chemical shifts of 143.6 and 114.4 ppm, respectively, and the molar fraction of the terminal double bonds relative to other types of double bonds being calculated by determining the peak areas of the signals in relation to the total integral of the olefin signals.

2. The number-average molecular masses ($M_n$) of the polymers prepared according to the examples were determined by means of gel permeation chromatography (GPC), standardized polyisobutenes being used for the calibration. The number average $M_n$ was calculated from the resulting chromatograms according to the equation $$M_n = \frac{\sum c_i}{\sum \frac{c_i}{M_i}}$$

where $c_i$ is the concentration of the individual polymer species i in the polymer blend obtained and $M_i$ is the molecular weight of the individual polymer species i. The molecular weight distribution, referred to below as dispersity D, was calculated from the ratio of weight average molecular weight ($M_w$) to number average molecular weight ($M_n$) according to the equation $$\frac{M_w}{M_n} = D$$

The weight average $M_w$ was determined from the resulting chromatograms with the aid of the formula $$M_w = \frac{\sum c_i M_i}{\sum c_i}$$

Example 1:

Hexane and isobutene in the weight ratio 1:1.75 were fed at $-10°$ C. to a loop reactor having an integrated circulation pump. The average residence time in the reactor was about 8.4 minutes. 143 mmol isopropanol and 89 mmol of boron trifluoride per kg of isobutene fed in were introduced into the reactor via a binary nozzle which was arranged upstream of the isobutene inflow. With the stated residence time, an isobutene conversion of 90% was established. The reaction product was removed via a take-off arranged upstream of the BF$_3$/isopropanol inflow and was transferred to a stirred container where 10% strength sodium hydroxide solution was added to it to stop the polymerization. After washing with water and phase separation, the organic phase was degassed under reduced pressure at above 200° C. The polyisobutene obtained had a number average molar mass (M$_n$) of 1000 dalton, a terminal vinylidene group content of >75 mol % and a dispersity M$_w$/M$_n$ of from 1.5 to 1.8.

A polyisobutene having an number average molecular weight of 2300, a terminal vinylidene group content of >75 mol % and a dispersity of from 1.6 to 1.9 was prepared in an analogous manner.

We claim:

1. A process for the continuous preparation of polyisobutene by cationic polymerization of isobutene and/or isobutene-containing hydrocarbons in the liquid phase in the presence of a complex of BF$_3$ and at least one cocatalyst, the BF$_3$/cocatalyst complex being produced in situ by adding BF$_3$ and cocatalyst in the reaction stream, wherein BF$_3$ and cocatalyst are added to the reaction stream via a binary nozzle having a central outlet for BF$_3$ and an annular outlet, arranged around the central outlet, for the cocatalyst.

2. A process as claimed in claim 1, wherein BF$_3$ and cocatalyst are added upstream of the inflow of the isobutene and/or isobutene-containing hydrocarbons to the reaction stream.

3. A process as claimed in claim 1, wherein the reaction stream has turbulent flow in the region of the addition of BF$_3$ and cocatalyst and of the inflow of isobutene and/or isobutene-containing hydrocarbons.

4. A process as claimed in claim 1, wherein the isobutene concentration in the reaction stream is kept constant.

5. A process as claimed in claim 1, wherein the cocatalyst is chosen from oxygen-containing compounds having at least one divalent oxygen atom.

6. A process as claimed in claim 1, wherein the polyisobutene contains more than 60 mol % of terminal vinylidene groups and has a number average molecular weight of from 500 to 50,000.

7. A process as claimed in claim 6, wherein the polyisobutene has a number average molecular weight of from 500 to 5000.

* * * * *